(12) United States Patent
Bartheld

(10) Patent No.: US 10,857,637 B2
(45) Date of Patent: Dec. 8, 2020

(54) ADJUSTING DEVICE

(71) Applicant: HELMHOLTZ-ZENTRUM DRESDEN-ROSSENDORF E.V., Dresden (DE)

(72) Inventor: Uwe Bartheld, Radeberg (DE)

(73) Assignee: HELMHOLTZ-ZENTRUM DRESDEN—ROSSENDORF E.V., Dresden (DE)

( * ) Notice: Subject to any disclaimer, the term of this patent is extended or adjusted under 35 U.S.C. 154(b) by 0 days.

(21) Appl. No.: 16/753,879

(22) PCT Filed: Oct. 12, 2018

(86) PCT No.: PCT/EP2018/077856
§ 371 (c)(1),
(2) Date: Apr. 6, 2020

(87) PCT Pub. No.: WO2019/073027
PCT Pub. Date: Apr. 18, 2019

(65) Prior Publication Data
US 2020/0282500 A1    Sep. 10, 2020

(30) Foreign Application Priority Data

Oct. 13, 2017  (DE) .................. 10 2017 123 920

(51) Int. Cl.
*B23Q 1/38*    (2006.01)
*B23Q 3/18*    (2006.01)
*F16M 7/00*    (2006.01)

(52) U.S. Cl.
CPC .............. *B23Q 1/38* (2013.01); *B23Q 3/183* (2013.01); *F16M 7/00* (2013.01)

(58) Field of Classification Search
CPC .......... B23Q 1/03; B23Q 1/032; B23Q 1/037; B23Q 1/38; B23Q 1/385; B23Q 3/107; B23Q 3/108; F15B 15/10; F15B 15/103
See application file for complete search history.

(56) References Cited

U.S. PATENT DOCUMENTS 4,090,431 A * 5/1978 Hirmann .................. B66F 3/35
                                                    92/92
4,275,869 A * 6/1981 Clements ................ F15B 15/10
                                                    254/89 H (Continued)

FOREIGN PATENT DOCUMENTS

DE    2141713 A1    2/1973
DE    275950 A1    2/1990

(Continued)

OTHER PUBLICATIONS

International Search Report and Written Opinion issued in PCT/EP2018/077856 and dated Jan. 23, 2019.

*Primary Examiner* — Tyrone V Hall, Jr.
(74) *Attorney, Agent, or Firm* — Heslin Rothenberg Farley and Mesiti PC; Nicholas Mesiti

(57) ABSTRACT

The invention relates to an adjusting device for spatially adjusting the position of an object, comprising a plurality of plate elements which are arranged one over the other and which have radial guide structures that engage into one another at mutually facing sides, wherein at least one pair of movement plates and a pair of inclination plates are arranged on a base. The movement plates have a constant thickness, and the respective upper radial guide structures and lower radial guide structures of each movement plate are offset eccentrically relative to one another. The inclination plates have a variable thickness, and the respective upper radial (Continued)

Figure 1:
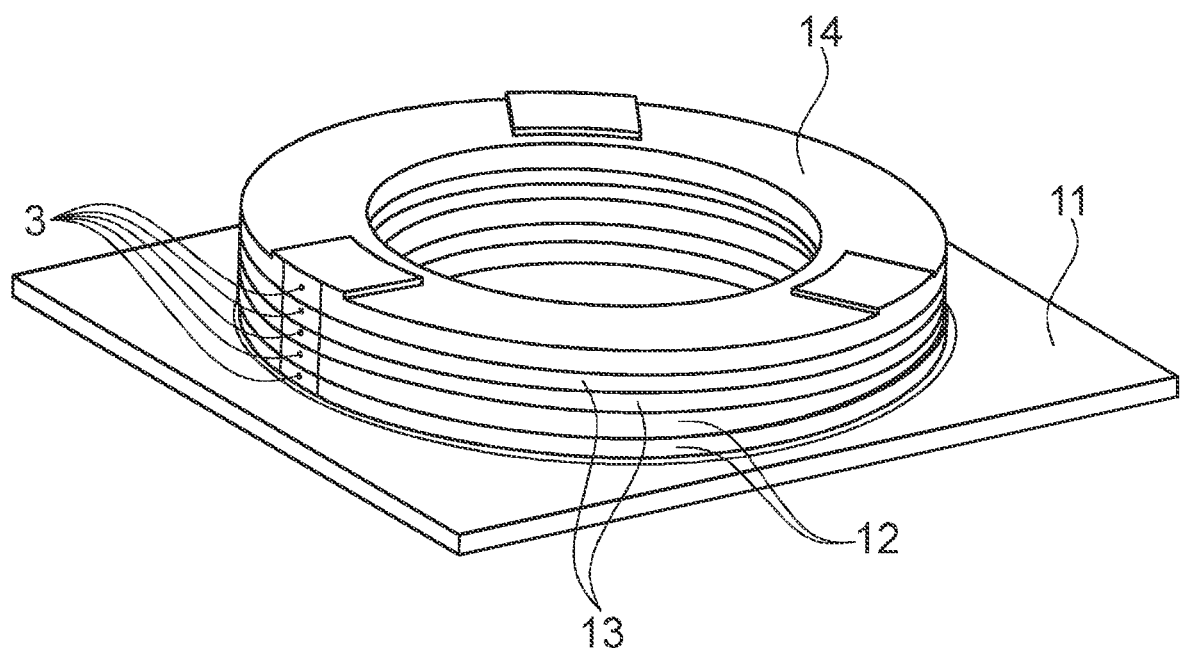

guide structures and lower radial guide structures of each inclination plate are arranged concentrically to one another.

18 Claims, 3 Drawing Sheets

(56) References Cited

U.S. PATENT DOCUMENTS

| | | | |
|---|---|---|---|
| 2005/0199774 A1* | 9/2005 | Reese | A45B 23/00 |
| | | | 248/529 |
| 2015/0197221 A1 | 7/2015 | Rothkegel | |
| 2017/0045062 A1* | 2/2017 | Roer | F15B 15/10 |

FOREIGN PATENT DOCUMENTS

| | | |
|---|---|---|
| DE | 19860566 C1 | 7/2000 |
| DE | 102015220817 A1 | 12/2015 |

\* cited by examiner

ADJUSTING DEVICE

CROSS REFERENCE TO RELATED APPLICATIONS

This application is the National Phase filing under 35 U.S.C. § 371 of International Application No. PCT/EP2018/077856, filed on Oct. 12, 2018, and published on Apr. 18, 2019 as WO 2019/073027 A1, which claims priority to German Application No. 102017123920.0, filed on Oct. 13, 2017. The contents of each of the prior applications are hereby incorporated by reference herein in their entirety.

The invention relates to an adjusting device for spatially adjusting the position of an object, for example of a scientific instrument such as a cryostat or the like, which has to be oriented precisely in spatial terms.

By means of the adjusting device proposed, loads weighing up to a few hundred kilograms can be for example precisely positioned and levelled with a resolution of just a few micrometers.

BACKGROUND

At the current time, such tasks are usually performed by very expensive and high-outlay mechanisms such as hexapods or combined linear pivot systems.

DD 275 950 A1 (see FIGS. 1 to 3 with associated description) discloses an adjusting device of the type in question for spatially adjusting the position of an object (in particular a heavy one), wherein a compressed-air connection generates an air cushion between two elements which can be moved in relation to one another, the air cushion reducing the friction between said elements. The movement capability of the object relative to a base plate is realized by means other than those used in respect of the subject matter of the application. A further such adjusting device is also described in DE 21 41 713 A. In the field of optics, DE 10 2015 220 817 A11 and DE 198 60 566 C1 disclose methods for positioning two elements relative to one another by virtue of them being displaced or tilted in relation to one another in one of the directions in space, wherein here too use is made of air bearings. The adjustment in position is realized by means other than those used in respect of the subject matter of the application.

It is the object of the present invention to specify an adjusting device which is intended for spatially adjusting the position of an object and is of straightforward construction, easy to produce and cost-effective.

This object is achieved by an adjusting device having the features of patent claim 1. Advantageous configurations and developments are described in the dependent patent claims.

SUMMARY OF THE INVENTION

The invention proposes an adjusting device which is intended for spatially adjusting the position of an object and comprises a plurality of plate elements which are arranged one above the other and have interengaging radial guide structures on mutually facing sides, wherein at least one pair of displacement plates and one pair of inclination plates are arranged on a base plate, wherein displacement plates have a constant thickness and their respective upper radial guide structure and lower radial guide structure are offset eccentrically in relation to one another, and inclination plates have a variable thickness and their respective upper radial guide structure and lower radial guide structure are arranged concentrically in relation to one another.

Radial guide structures should be understood here to mean circular or annular three-dimensional formations on plate elements having otherwise planar boundary surfaces. The radial guide structures can be produced, for example, by machining operations such as turning or the like, but also by forming or molding operations such as injection molding or the like.

In order that the mutually facing radial guide structures of two adjacent plate elements can interengage, it is necessary for one of them to be convex, i.e. raised, and for the other to be concave, i.e. recessed. Of course, it is also possible here for radial guide structures to have formations which are at the same time raised and recessed. The circular or annular contours of the radial guide structures ensure that the plate elements interlock in the lateral, i.e. horizontal, direction, and that in each case two adjacent plate elements can be rotated relative to one another. "Circular" here is intended to mean an elevation or depression which extends within a diameter of a circle, and "annular" is intended to mean an encircling elevation or depression which is of finite width and in the central region of which the respective surface of the plate element extends, for example, at the same height level as it does outside the radial guide structure.

The only critical factor is that, on the one hand, the radial guide structure provides for free rotation of one plate element relative to an adjacent plate element, and, on the other hand, the interengaging radial guide structures on the mutually facing surfaces of two adjacent plate elements effectively prevent undesired relative displacement between these two plate elements in the horizontal plane, without any relative rotation.

The eccentric arrangement of the radial guide structures on the upper side and the underside of the displacement plates means that, in the case of absolute rotation of the displacement plate about its lower radial guide structure in the global coordinate system, the upper radial guide structure describes in each case an eccentric circular path, i.e. all the points of the upper radial guide structure rotate at the same angular speed over differently sized circles about the center point of the lower radial guide structure. A suitable selection of the angles of rotation of the two displacement plates at the same time allows all the objects arranged above said displacement plates to be displaced within certain limits in the horizontal plane.

The variable thickness of the inclination plates results in the inclination plates—with the exception of the radial guide structures—being wedge-shaped with a certain, predeterminable wedge angle. As a result of this wedge shape of the inclination plates, basically all the objects arranged above a rotating inclination plate are tilted out of the horizontal by an angle of inclination which corresponds to the wedge angle of the rotating inclination plate. However, since two identical inclination plates are arranged one above the other, the angle of inclination of an object arranged above the same can be adjusted between zero and double the wedge angle, depending on the rotation of the two inclination plates relative to one another.

It is basically immaterial for the functioning of the adjusting device if first of all the displacement plates and then the inclination plates are arranged on the base plate or if first of all the inclination plates and then the displacement plates are arranged on the base plate. However, it is advantageous for the first-mentioned variant to be selected, because otherwise, when the inclination plates are adjusted, it is also the case that the displacement plates are tilted unnecessarily out of the vertical, which, in particular in the case of very heavy objects being supported by the adjusting device, can be disadvantageous since the displacement plane also inclines as a result.

The combination of two displacement plates and two inclination plates means that it is possible for any object arranged on the upper side of the arrangement of plate elements to be displaced, by virtue of the displacement plates being rotated in the horizontal plane, and to be inclined at the same time, by virtue of the inclination plates being rotated relative to the vertical direction, or to be moved from an undesired inclination into a vertical orientation.

The adjusting device proposed is of extremely straightforward construction, and therefore very cost-effective, and, in the simplest case, can be adjusted by hand.

In a straightforward configuration, the object which is to be oriented can be set down in position for example on the uppermost side of the stack of plates, i.e. of the described arrangement of plate elements, with or without any fastening. There is then no need for the uppermost plate element to have a radial guide structure on its upper side, because said upper side is not directed towards any other plate element in the arrangement.

In another configuration, however, provision is made for the uppermost plate element provided to be a head plate, which is designed to accommodate the object which is to be adjusted. This configuration has the advantage that the displacement plates and inclination plates need not perform any other function. In this case, the head plate performs the function of accommodating the object which is to be oriented and, for this purpose, it can have fastening means, for example threaded bores or the like, on its upper side. In order to guide the head plate in the horizontal direction and to prevent unintentional displacement in relation to the plate elements arranged therebeneath, it is also the case here that the upper side of the plate element (displacement plate or inclination plate) which is arranged directly beneath the head plate and the underside of the head plate have corresponding, interengaging radial guide structures.

In a further configuration of the adjusting device proposed, provision can be made for at least one plate element to have a compressed-air connection, which can be connected to a compressed-air source. Such a compressed-air connection can be used to generate an air cushion for example between two adjacent plate elements, the air cushion reducing the friction between said plate elements, and therefore the plate elements being more easily rotatable relative to one another. For this purpose, provision can advantageously also be made for at least one air channel to extend from the compressed-air connection into the region of at least one radial guide structure of the plate element and to open out there. Of course, for example all the plate elements can have separate compressed-air connections, and therefore air cushions can be generated selectively between each pair of adjacent plate elements in order to generate just a single relative rotation and to avoid unintended relative rotation of other plate elements.

In an advantageous configuration, at least one plate element has a scale, which indicates a displacement value or an inclination value or an angle-of-rotation value. This facilitates the precise adjustment of a displacement in the horizontal plane or of an inclination relative to the vertical direction. For this purpose, provision can advantageously also be made, for example, for at least one plate element, for example the uppermost plate element, which supports the object which is to be oriented, to have a spirit level, in particular a circular level, which allows orientation in two directions in space.

In order to automate and/or to facilitate the adjustment of very heavy objects which are to be oriented, provision can also be made, according to a further configuration, for at least one plate element to be operatively connected to a drive device, which causes the plate element to rotate. For example, such a drive device can be a servomotor, which is operatively connected to the at least one plate element by an elastic pulling means. Such elastic pulling means can be, for example, belts which are known per se, for example V-belts, round belts, toothed belts, etc., made of fiber-reinforced elastomer materials, which engage for example in appropriately shaped peripheries, i.e. grooves, toothing formations, etc., of the plate elements. Elastic pulling means have the advantage that they are capable, within certain limits, of compensating for the eccentricity of the displacement plates and the wobbling or tumbling movements of the inclination plates.

In order for it also to be possible for the adjusting device proposed to be operated in an automated manner, a development provides for at least one drive device to be connected to a control device. As an alternative, or in addition, provision can be made, in respect of the adjusting device proposed, for at least one compressed-air source to be connected to a control device. For example when a positional deviation which is in need of correction is detected, it is possible for the control device to supply selectively one or more compressed-air connections with compressed air, this resulting in air cushions being generated between adjacent plate elements, the air cushions reducing the friction between said plate elements, and then to actuate likewise selectively one or more drive devices in order to achieve displacement of, and/or a change in inclination in, the object arranged on the adjusting device. If, according to a further configuration, one or more plate elements and/or the object which is to be oriented have/has position sensors and/or inclination sensors, then the control function can be extended by way of feedback to give a closed-loop control function.

If the device is to be designed to orient particularly large objects, it is possible, according to an advantageous development, for the plate elements to be made up of segments (for example like those in a cake) and for the segments to be connected to one another. The segments could then have, for example, separate compressed-air connections. In this case, the plate elements can for example still be configured such that a dedicated air cushion can form beneath each segment.

In the case of particularly heavy objects, instead of air, use can also be made of a liquid, such as water or the like, in order to achieve an even higher supporting force.

Objects which can be achieved by the invention and also the advantages or improvements over the prior art are as follows:

highly precise positioning and leveling of objects which are to be oriented, compressed-air support renders lubricant-free operation possible, the adjusting device can be scaled virtually as desired, low compressive loading as a result of the load being distributed over a large surface area, the low compressive loading means that the components of the adjusting device can also be produced from materials with a lesser strength (e.g. plastics), the adjusting device can be optimized for each case in respect of resolution and displacement or angle of inclination, the adjusting device is straightforward and cost-effective to produce, the adjusting device is easy to maintain, the adjusting device is easy to alter by virtue of components being changed over, the adjusting device can realize independent, clearly defined movement sequences, the adjusting device can be used in a precise manner even without electronics, the adjusting device has a self-retaining function once the compressed air has been disabled, the adjusting device is vibration-free, the adjusting device can additionally be braced if appropriate fastening means or clamping means are provided for this purpose, the adjusting device can easily be combined with additional movement systems (e.g. in order to realize additional displacement in the vertical direction), the adjusting device has a small overall height and requires only a small amount of space, there are no load-bearing pressure points or bearing points.

BRIEF DESCRIPTION OF THE DRAWING FIGURES

Figure 2:
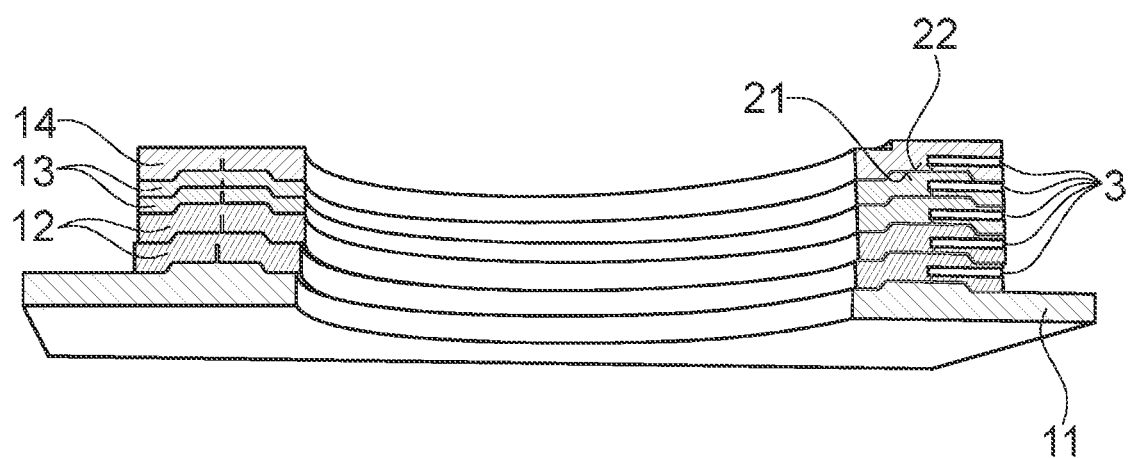
Figure 3:
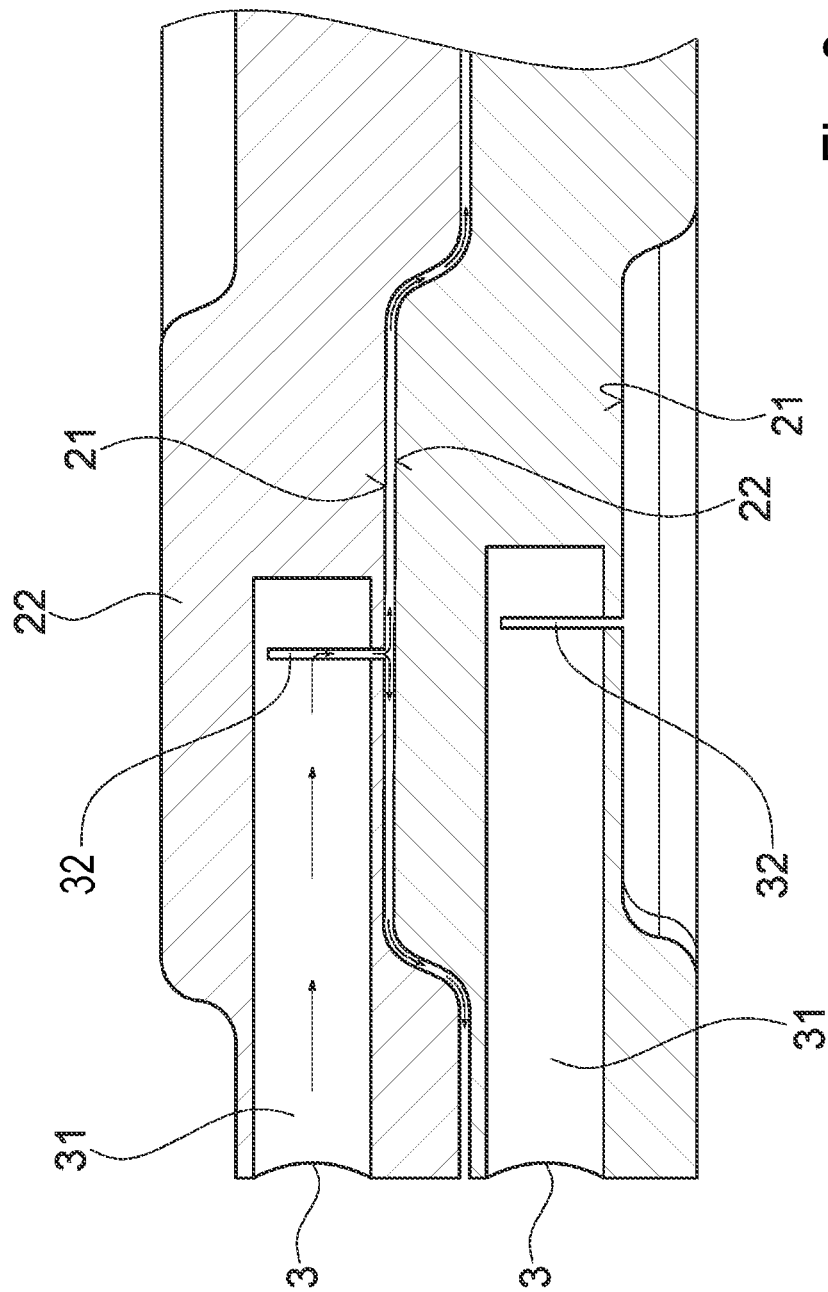
Figure 4:
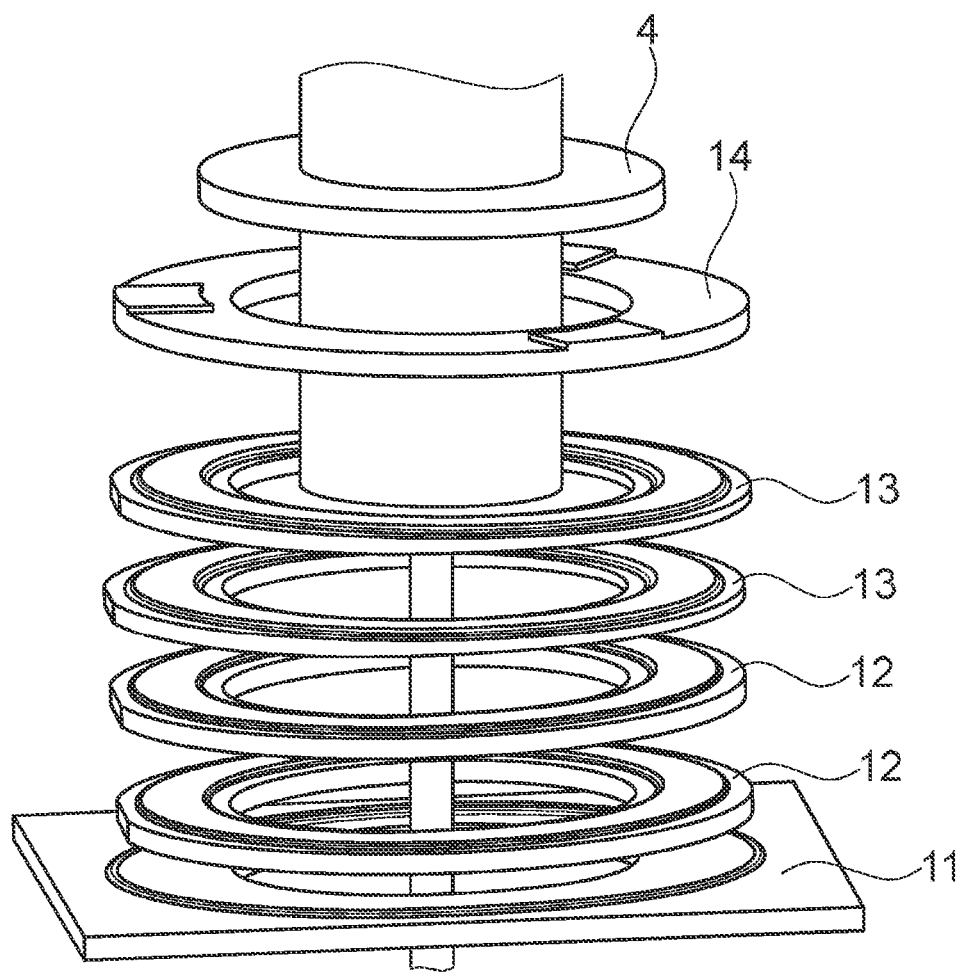
Figure 5:
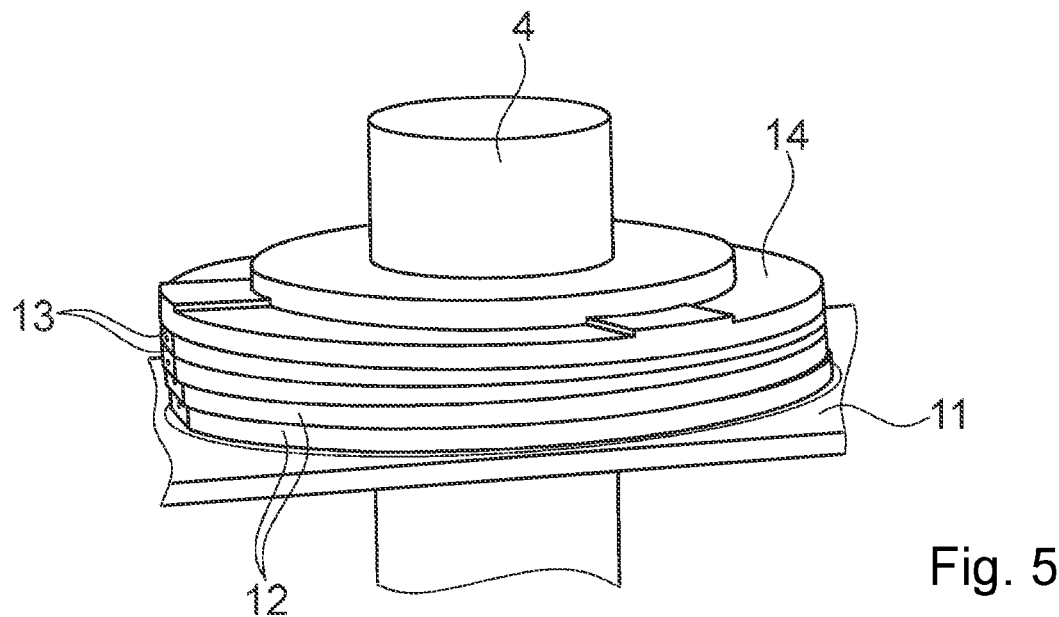

The invention will be explained in more detail hereinbelow with reference to an exemplary embodiment and associated drawings, in which:

FIG. 1 shows an overall view of an exemplary embodiment of an adjusting device according to the invention, FIG. 2 shows a sectional illustration through said adjusting device, FIG. 3 shows an enlarged detail of a section through an air channel, FIG. 4 shows an exploded illustration of the device, and FIG. 5 shows an overall view of the device with an object which is to be oriented.

DETAILED DESCRIPTION

The adjusting device of the exemplary embodiment comprises a base plate 11 and five plate elements located one above the other above said base plate, that is to say, as seen from bottom to top, two displacement plates 12, two inclination plates 13 and a head plate 14, which is designed to accommodate the object 4 which is to be oriented. In the exemplary embodiment, the base plate 11 is of continuous configuration, whereas the displacement plates 12, the inclination plates 13 and the head plate 14 each have a through-passage in their central region. These through-passages create space so that an object 4 which is to be oriented, and is supported by the head plate 14, need not be arranged exclusively above the upper surface of the head plate 14, rather, it can also extend downward from said upper surface of the head plate 14 in the through the through-passages of the other plate elements 12, 13.

The base plate 11, which is at the bottom, has a convex, annular radial guide structure 21 only on its upper side. The head plate 14, which is at the top, has a concave, annular radial guide structure 22 only on its underside. As seen from bottom to top, two displacement plates 12 and, above these, two inclination plates 13 are arranged one above the other between the upper side of the base plate 11 and the underside of the head plate 14, all the displacement plates and inclination plates having a concave, annular radial guide structure 22 in each case on their underside and a convex, annular radial guide structure 21 on their upper side, wherein the mutually facing convex, annular radial guide structures 21 and concave, annular radial guide structures 22 of adjacent plate elements 11, 12, 13, 14 interengage in a congruent manner if the plate elements 11, 12, 13, 14 are stacked one above the other. The interengaging radial guide structures 21, 22 ensure that the plate elements 12, 13, 14 cannot slide laterally relative to the plate element 11, 12, 13 located beneath in each case. It is only possible to rotate them in relation to one another as desired.

As far as the two displacement plates 12 are concerned, the axes of rotation of the upper and lower radial guide structures 21, 22 are offset eccentrically in relation to one another in each case. If these displacement plates 12 are rotated relative to one another, it is possible for the plate elements 13, 14 located above, and also for an object 4 which is arranged thereon and is to be oriented, to be displaced laterally. The maximum displacement distance here is dependent on the eccentric offset of the axes of rotation which has been selected at the production stage. If this offset is identical for the two displacement plates 12, the two eccentricities cancel each other out exactly when they are located precisely opposite one another. It is thus possible by virtue of the corresponding rotation of the displacement plates 12, for the object 4 arranged above the same to move to any desired position within a horizontal circular surface of which the radius corresponds to the sum of the eccentricities of the displacement plates 12.

As far as the two inclination plates 13 arranged above the displacement plates are concerned, the axes of rotation of the upper and lower radial guide structures 21, 22 are inclined in relation to one another. If these two inclination plates 13 are rotated relative to one another, it is possible for an object 4 which is arranged thereon and is to be oriented to be inclined to the side in a defined manner. If the inclination of the axes of rotation of the upper and lower radial guide structures 21, 22 on the inclination plates 13 is identical, the inclinations cancel each other out precisely in the event of minimum deflection. In the event of maximum deflection, the two wedge angles of the inclination plates 13 are added together. Within this overall deflection, any desired angle can be steplessly adjusted and set.

The uppermost plate element is a head plate 14, which serves to fasten the object 4 which is to be moved and ensures that the latter does not rotate along with the adjustment of the plate elements 12, 13, if this is undesirable.

The plate elements 12, 13, 14 each have a central through-passage, and therefore the object 4 which is to be moved can also project downwards through the through-passages when the system has been mounted on a framework or the like. All that is then necessary is for the plate elements and the bore to be selected to be of a size sufficient for the object 4 not to come into contact with the inner side of the central bore in the event of a full deflection movement.

Should the weight of the object 4 which is to be moved be very large, the resulting friction means that it is no longer possible for the plate elements 12, 13, 14 to rotate. In order to remedy this problem, the exemplary embodiment provides, in the center of the lower radial guide structures 22, a respective annular groove 32, into which opens out an air channel 31, which can be connected to a compressed-air source by a lateral compressed-air connection 3 on the circumference of the respective plate element 12, 13, 14. If compressed air is pumped into the system through said compressed-air connection 3, the compressed air flows through the air channel 31 and the annular groove 32 between the radial guide structures 21, 22 of the plate elements 11, 12, 13, 14 located one upon the other and, from there, flows in the radially outward and inward directions. If the radial guide structures 21, 22 have been manufactured with an appropriate level of accuracy and a low level of roughness, the system can easily be adjusted, even under very high loads, as a result of the air cushion produced between the bearing surfaces. The large surface area of the bearing surfaces of the plate elements 11, 12, 13, 14 one upon the other means that the pressure which has to be supplied here by the compressed-air installation is very low.

Since the plate elements 11, 12, 13, 14 slide one upon the other here ideally without contact, it is possible to dispense with lubricants between the plate elements 11, 12, 13, 14. If the supply of compressed air is interrupted once the desired end position has been reached, the system self-clamps firmly in this position under the load. In addition, however, it is also possible for the entire system to be braced in addition by clamping levers or clamping claws, which would be possible only with difficulty if use were made of ball bearings or the like during mounting. As a result, the object 4 is arrested in a very firm and robust manner.

Since the load of the object 4 which is to be moved is distributed to a great extent as a result of the inevitably arising large-area bearing surfaces between the plate elements 11, 12, 13, 14, the system need not necessarily be manufactured from metal. It can therefore also be produced from relatively soft materials (plastic or the like), should this be necessary for technical reasons.

A graduated scale or the like can be engraved on the base plate 11, in the simplest case around the radial guide structure 21, and therefore the adjustment of the plate elements 12, 13, 14 can be read off, or carried out, using corresponding markings or the like. It is likewise possible for electronic displacement-measuring systems to be fitted. For rotation of the plate elements, it is recommended to use C-wrenches, which engage in grooves or bores made in the circumference of the plate elements 12, 13, 14.

Adjusting Device

LIST OF REFERENCE SIGNS 11 base plate
12 displacement plate
13 inclination plate
14 head plate
21 upper radial guide structure
22 lower radial guide structure
3 compressed-air connection
31 air channel
32 annular groove
4 object which is to be oriented

The invention claimed is:

1. An adjusting device for spatially adjusting the position of an object, comprising a plurality of plate elements which are arranged one above the other and have interengaging radial guide structures on mutually facing sides, wherein at least one pair of displacement plates and one pair of inclination plates are arranged on a base plate, wherein displacement plates have a constant thickness and their respective upper radial guide structure and lower radial guide structure are offset eccentrically in relation to one another, and inclination plates have a variable thickness and their respective upper radial guide structure and lower radial guide structure are arranged concentrically in relation to one another.

2. The adjusting device as claimed in claim 1, wherein +− the uppermost plate element provided is a head plate, which is designed to accommodate the object which is to be adjusted.

3. The adjusting device as claimed in claim 2, wherein at least one plate element has a compressed-air connection, which can be connected to a compressed-air source.

4. The adjusting device as claimed in claim 3, wherein at least one air channel extends from the compressed-air connection into the region of at least one radial guide structure of the plate element and opens out there.

5. The adjusting device as claimed in claim 4, wherein at least one plate element has a scale, which indicates a displacement value or an inclination value or an angle-of-rotation value.

6. The adjusting device as claimed in claim 5, wherein at least one plate element has a spirit level.

7. The adjusting device as claimed in claim 6, wherein at least one plate element is operatively connected to a drive device, which causes the plate element to rotate.

8. The adjusting device as claimed in claim 7, wherein the drive device is a servomotor, which is operatively connected to the at least one plate element by an elastic pulling means.

9. The adjusting device as claimed in claim 8, wherein at least one drive device is connected to a control device.

10. The adjusting device as claimed in claim 9, wherein at least one compressed-air source is connected to a control device.

11. The adjusting device as claimed in claim 10, wherein at least one plate element has an annular radial guide structure, in the central region of which the plate element has a through-passage.

12. The adjusting device as claimed in claim 7, wherein at least one drive device is connected to a control device.

13. The adjusting device as claimed in claim 1, wherein at least one plate element has a compressed-air connection, which can be connected to a compressed-air source.

14. The adjusting device as claimed in claim 1, wherein at least one plate element has a scale, which indicates a displacement value or an inclination value or an angle-of-rotation value.

15. The adjusting device as claimed in claim 1, wherein at least one plate element has a spirit level.

16. The adjusting device as claimed in claim 1, wherein at least one plate element is operatively connected to a drive device, which causes the plate element to rotate.

17. The adjusting device as claimed in claim 1, wherein at least one compressed-air source is connected to a control device.

18. The adjusting device as claimed in claim 1, wherein at least one plate element has an annular radial guide structure, in the central region of which the plate element has a through-passage.

* * * * *